United States Patent Office 3,518,870
Patented July 7, 1970

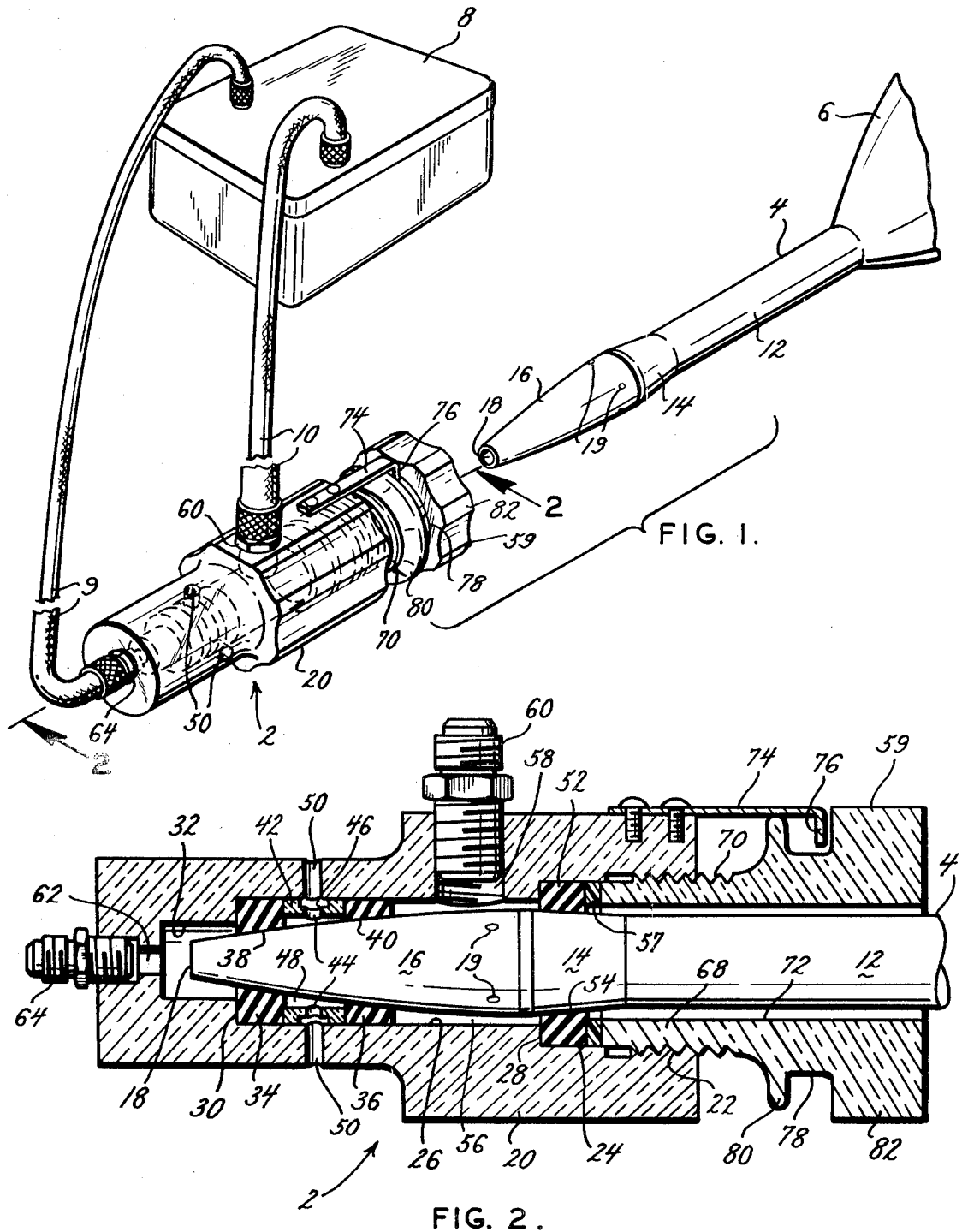

3,518,870
TESTING ADAPTER FOR AIRCRAFT
PITOT-STATIC TUBES
Lester A. Shubert, Glendale, Mo., and Robert L. Scharringhausen, Belleville, Ill., assignors to McDonnell Douglas Corporation, St. Louis, Mo., a corporation of Maryland
Filed Sept. 18, 1968, Ser. No. 760,579
Int. Cl. G01f 25/00
U.S. Cl. 73—3         11 Claims

ABSTRACT OF THE DISCLOSURE

A testing adapter for aircraft pitot-static tubes isolates the forwardly opening dynamic port and the rearwardly presented laterally opening static ports from ambient pressure conditions. The adapter constructed from a unitary body has an elongated cavity that opens outwardly at one end of the body for axial insertion of the pitot-static tube into the cavity. A pressure chamber is formed in the cavity by positioning a first resilient seal against the body and tube, intermediate the dynamic and static ports. A vacuum chamber is formed in the cavity by positioning a second resilient seal against the body and tube, rearwardly from the static ports. The body is formed from a transparent material so that the seals and their position with respect to the ports on the tube can be observed. A pressure source is connected through a pressure port into the pressure chamber so that a pressure above ambient pressure can be induced. A vacuum source is connected through a vacuum port into the vacuum chamber so that a pressure below ambient pressure can be induced. Thus, the dynamic and static lines can be placed at known pressures which will render predetermined readings on the aircraft instruments.

---

The present invention relates in general to devices for testing aircraft pitot-static tubes and associated components and, more particularly, to a testing adapter for isolating the dynamic and static ports of an aircraft pitot-static tube from ambient conditions as well as from one another.

The pitot-static tubes of high performance aircraft are coupled with various aircraft instruments which are responsive to the impact pressures at the dynamic port of the tube and the static pressures at the static ports. For example, the altimeter and vertical velocity indicator are responsive to static pressure conditions, while the air speed and mach number indicator as well as the air data computor set are responsive to both dynamic and static pressures. Occasionally these instruments and the lines interconnecting them and the ports of the pitot-static tube, as well as various associated components develop leaks, and these leaks cause the instruments to give erroneous readings. Since the performance of the instruments connected with the pitot-static tube of an aircraft is critical to the operation of the aircraft, the entire system associated with the pitot-static tube must be tested frequently to insure that no leaks are present which would cause erroneous readings.

Heretofore, the pitot-static tube and associated components have been tested by connecting test equipment to special fittings on the aircraft which communicate with the lines leading from the dynamic and static ports of the tube. In this manner, the dynamic and static lines can be placed at known pressures which will render predetermined readings on the aircraft instruments. This procedure, however, is not only time consuming, but the test equipment itself is subject to leakage where it connects with the aircraft test fittings and these leaks are difficult to detect.

One of the principal objects of the present invention is to provide a testing adapter through which known pressures can be induced in the dynamic and static lines leading from the pitot-static tube of an aircraft. Another object is to provide a testing adapter which is installed on the pitot-static tube of an aircraft with a minimum amount of manual labor, thereby eliminating the necessity for connecting test equipment to separate fittings. A further object is to provide an adapter having seals which can be observed through the adapter body to determine whether or not they are seated properly against the pitot-static tube. Still another object is to provide an adapter which is simple and rugged in construction, light in weight and compact in size.

These and other objects and advantages will become apparent hereinafter.

The present invention is embodied in a testing adapter including a body having a cavity into which seals are fitted. When the pitot-static tube of an aircraft is inserted into the cavity, the seals embrace the tube such that its dynamic and static ports are isolated from each other as well as from the atmosphere.

The invention also consists in the parts and in the arrangements and combinations of parts hereinafter described and claimed. In the accompanying drawings which form part of the specification and wherein like numerals and letters refer to like parts wherever they occur:

FIG. 1 is a perspective view of an aircraft pitot-static tube and an adapter constructed in accordance with and embodying the present invention; and FIG. 2 is a longitudinal sectional view of the adapter.

Referring now in detail to the drawings, 2 designates a testing adapter for isolating selected segments of a pitot-static tube 4 on an aircraft 6 so that those segments may be placed at predetermined pressures generated within a remotely located pressure-vacuum source 8. The pressure-vacuum source 8 is conventional in design and manufacture and will therefore not be described in greater detail, other than to note that it is connected to the adapter 2 by means of a flexible pressure hose 9 and a flexible vacuum hose 10.

The pitot-static tube 4 projects forwardly from the fuselage of the aircraft 6 and includes a tubular mounting section 12, an intermediate section 14, and a tapered end section 16. The intermediate section 14 flares slightly outwardly from the mounting section 12, while the end section 16 tapers arcuately away from the opposite end of the intermediate section 14. The end section 16 forwardly terminates at a forwardly opening ram air inlet port 18 for sensing the dynamic or impact pressure generated by movement of the aircraft 6 through the atmosphere. The end section 16 is further provided near its rear end where its diameter is maximum with a plurality of circumferentially spaced static ports 19 which open laterally and thereby are subjected only to ambient pressures.

The adapter 2 includes a body portion 20 which is preferably formed from a strong transparent plastic having high optical clarity such as Lexan polycarbonate. The body portion 20 is provided with a rearwardly opening threaded bore 22 which at its forward end merges into an aft bore 24. The aft bore 24, in turn, opens into a diametrally reduced intermediate bore 26 at a shoulder 28. The intermediate bore 26 is slightly larger in diameter than the end section 16 of the pitot-static tube 4, and it similarly terminates at a shoulder 30 where it opens into a diametrally reduced pressure chamber 32. The bores 22, 24, and 26 and the pressure chamber 32 are all coaxial and form an elongated cavity within the body 20.

Fitted into the intermediate bore 26 are forward and intermediate annular seals 34 and 36 having seal faces 38 and 40 which are contoured to substantially conform to the forward and mid-portions, respectively, of the tapered end section 16 on the pitot-static tube 4. The forward seal 34 abuts against the shoulder 30, while the intermediate seal 36 is maintained in predetermined spaced relation from seal 34 by means of an annular spacer element 42 having a plurality of circumferentially spaced apertures 44 and an outwardly opening groove 46 into which the apertures 44 open. The seals 34 and 36 are formed from an elastomeric substance, while the spacer 42 is formed from a rigid material which is preferably transparent also. The seals 34 and 36 define the axial limits of a vented chamber 48 which communicates with the surrounding atmosphere through the apertures 44 and groove 46 of the spacer 42 and a plurality of radial vents 50 extending through the body 20 and communicating with the groove 46.

The aft bore 24 also retains an elastomeric aft seal 52 having a seal face 54 which is contoured to generally conform with the taper of the intermediate section 14 of the pitot-static tube 4. The aft seal 52 bears against the shoulder 28, and together with the intermediate seal 36 divides the intermediate bore 26 into a vacuum chamber 56. A pressure ring 57 is positioned against the seal 52 and is retained in the aft bore 24 when the body 20 is threaded onto the cooperating bushing member 59.

The body 20 is further provided with a radial vacuum port 58 which communicates with the vacuum chamber 56, and threaded into the port 58 is a fitting 60, to which the vacuum hose 10 is connected. Similarly, at its forward end the body 20 is provided with an axially extending pressure port 62 into which a fitting 64 is threaded. The pressure hose 9 connects with the fitting 64.

The body 20 is held on the tube 12 by the bushing 59 having a nose portion 68 provided with external threads 70 which engage the threaded bore 22. Internally the bushing 59 is relieved in the formation of an axially extending cylindrical bore 72 which opens into the aft bore 24 of the body 20 and is large enough to slidably accommodate the pitot-static tube 4. Complete withdrawal of the nose portion 68 from the threaded bore 22 is prevented by a spring-metal clip 74 which is attached to the body portion 20 and is provided with an inwardly turned lip 76 which extends into a groove 78 formed in the bushing 59. In this connection the axial dimension of the groove 78 is considerably greater than the thickness of the lip 76 so that the bushing 59 can thread into and out of the body 20 to a limited extent. When the lip 76 is against the flange 80 of the groove 78, the forward end of the nose portion 68 will not bear against the pressure ring 57 with sufficient force to deform the aft seal 52. However, when the bushing 59 is screwed inwardly, its annular end will bear against the ring 57 and axially compress the seal 52. This, of course, will cause the seal 52 to deform inwardly.

In use, the bushing 59 is first withdrawn from the body 20 by placing the lip 76 of the clip 74 in juxtaposition to the flange 80. When this occurs, the aft seal 52 will be free of compressive forces and consequently will not be deformed inwardly. Thereafter, the bore 72 in the bushing 59 is aligned with the forward end of the pitot-static tube 4 and the entire adapter 2 is pushed rearwardly toward the fuselage of the aircraft 6, causing the tube 4 to, in effect, advance through bore 72. As the tube 4 advances, its tapered end section 16 will engage the face 54 of the aft seal 52 and by reason of its tapered configuration it will spread the seal 52. In time the seal face 54 will pass over the static ports 19 and onto the reversely tapered surface of the intermediate section 14. As this occurs, the forward and mid-portions of the end section 16 will respectively engage the seal faces 38 and 40 on the forward and intermediate seals 34 and 36 so that the pressure chamber 32, the vented chamber 48 and the vacuum chamber 56 are effectively isolated from one another. Thereafter, the bushing 59 is turned at its gripping portion 82, causing its nose portion 68 to advance into the threaded bore 22 and force the pressure ring 57 into the seal 52. This axially compresses the seal 52 and causes it to deform inwardly and snuggly embrace the tapered surface of the intermediate section 14, thereby effectively isolating the vacuum chamber 56 from ambient conditions.

The desired pressure conditions are induced in the pressure chamber 32 and vacuum chamber 56 by energizing pressure-vacuum source 8, in which case the pressure in the chamber 32 will be above atmospheric pressure, while the pressure in the chamber 56 will be below atmospheric. Inasmuch as one side of each of the seals 34 and 36 is exposed to the vented chamber 48, a pressure differential will exist across both seals 34 and 36, and that differential will result in an axially directed force being applied to the seals 34 and 36 such that the seals 34 and 36 are urged more tightly against the tapered surface of section 16. More particularly, the pressure in the chamber 32 will be greater than atmospheric conditions within the vented chamber 48 and consequently the seal 34 will be urged toward the enlarged end of the end section 16 and into tighter embracement with its tapering surface. Similarly, the pressure within the vented chamber 48 will be greater than the pressure within the vacuum chamber 56, and the force generated by that pressure differential will urge the intermediate seal 36 into tighter embracement with the end section 16 forwardly of the static ports 19. Accordingly, the static ports 19, being interposed between the seals 36 and 52, will be isolated from ambient conditions and subjected to the reduced pressure of the vacuum chamber 56. The port 18 subject to ram flow, on the other hand, is open to the pressure chamber 32 where it will be subjected to the elevated pressure conditions induced therein. Since the pressures induced in the chambers 32 and 56 are known and are characteristic of known flight conditions, the instruments of the aircraft which respond to pressures at the pitot-static tube can be checked for accuracy. Of course, if the pitot tube or its associated pneumatic lines possess a leak, this can also be detected.

Inasmuch as the body 20 is formed from a transparent material, the forward end of the end section 16 is easily manuevered through the seals 34, 36 and 52 without damaging them. Moreover, this transparency enables the operator to continuously observe the seals 34, 36 and 52 to insure that they seat properly at the outset and remain properly seated throughout the duration of the test.

The adapter 2 is removed from the pitot-static tube 4 merely by restoring the chambers 32 and 56 to ambient conditions, threading the bushing 59 partially outwardly in the bore 22 so that it no longer deforms the seal 52 inwardly, and then withdrawing the entire adapter 2 from the pitot-static tube 4.

The invention is intended to cover all changes and modifications of the example of the invention herein chosen for purposes of the disclosure which do not constitute departures from the spirit and scope of the invention.

What is claimed is:

1. An adapter for isolating the forwardly opening dynamic port and the rearwardly presented laterally opening static ports of a pitot-static tube from ambient pressure conditions; said adapter comprising a unitary body having an elongated cavity opening outwardly at one end of the body for axial insertion of the pitot-static tube into the cavity, the cavity including a pressure chamber into which the dynamic port opens when the pitot-static tube is fully inserted into the cavity and a vacuum chamber into which the static ports open when the tube is inserted, a first resilient seal in the cavity and positioned against the body at the end of the pressure chamber for embracing the pitot-static tube intermediate the dynamic and static ports, a second resilient seal in the cavity and positioned against the body at the end of the vacuum chamber for embracing the pitot-static tube rearwardly from the static ports, the body being formed from a transparent material so that the seals and their position with respect to the ports on the pitot-static tube can be observed, a pressure port opening into the pressure chamber and connectable with means for inducing pressures above ambient pressure, and a vacuum port opening into the vacuum chamber and connectable with means for inducing pressures below ambient pressure.

2. An adapter according to claim 1 wherein the pitot-static tube tapers inwardly from the static ports to the dynamic port, and wherein the first seal embraces the tapered surface.

3. An adapter according to claim 2 and further characterized by a third resilient seal in the body at the forward end of the vacuum chamber for engaging the inwardly tapering surface of the pitot-static tube.

4. An adapter according to claim 3 wherein the first and third seals are located in axially spaced relation, and wherein the space intermediate the first and third seal is vented to the atmosphere.

5. An adapter according to claim 4 wherein the pitot-static tube rearwardly from the static port tapers inwardly, and wherein the second seal embraces the inwardly tapering surface to the rear of the static ports.

6. An adapter for isolating the forwardly opening dynamic port and the rearwardly presented laterally opening static ports of a pitot-static tube from ambient pressure conditions; said adapter comprising a body having an elongated cavity opening outwardly at one end of the body for axial insertion of the pitot-static tube into the cavity, the cavity including a pressure chamber into which the dynamic port opens when the pitot-static tube is fully inserted into the cavity and a vacuum chamber into which the static ports open when the tube is inserted, a first resilient seal in the body at the end of the pressure chamber for embracing the pitot-static tube intermediate the dynamic and static ports, a second resilient seal in the body at the end of the vacuum chamber for embracing the pitot-static tube rearwardly from the static ports, a pressure port opening into the pressure chamber and connectable with means for inducing pressures above ambient pressure, a vacuum port opening into the vacuum chamber and connectable with means for inducing pressures below ambient pressure, and means for further compressing the second seal about the pitot-static tube after the tube has been inserted into the cavity.

7. An adapter according to claim 6 wherein the second seal fits snugly into the body and is restrained from expanding outwardly, and wherein the means for further compressing the second seal about the tube axially compresses the resilient seal and causes the seal to deform inwardly and thereby more tightly embrace the pitot-static tube.

8. An adapter according to claim 6 wherein the second seal fits snugly within the body and is restrained from expanding outwardly, wherein the means for further compressing the second seal comprises a bushing threaded into the outwardly opening end of the cavity to the rear of the second seal and having an axially extending bore through which the pitot-static tube extends, the bushing aligning with and axially compressing the second seal when it is threaded into the cavity whereby the second seal will deform inwardly and more tightly embrace the pitot-static tube.

9. An adapter according to claim 8 wherein the bushing is provided with an annular groove, and wherein the body carries a spring-clip having a lip which turns into the groove, whereby axial movement of the bushing relative to said body is limited.

10. An adapter for isolating the forwardly opening dynamic port and the rearwardly presented laterally opening static ports of a pitot-static tube from ambient pressure conditions; said adapter comprising a unitary body having an elongated cavity opening outwardly at one end of the body for axial insertion of the pitot-static tube into the cavity, the cavity including a pressure chamber into which the dynamic port opens when the pitot-static tube is fully inserted into the cavity and a vacuum chamber into which the static ports open when the tube is inserted, a first resilient seal in the body adjacent the pressure chamber for engagement by pitot-static tube intermediate the dynamic and static ports, a second resilient seal in the body adjacent the vacuum chamber for engagement by the pitot-static tube rearwardly from the static ports, a third resilient seal in the body adjacent the vacuum chamber and spaced from said second seal and engaged by the pitot-static tube forwardly of the static ports and rearwardly from the first seal, a pressure port opening into the pressure chamber and connectable with a means for inducing pressures above ambient pressure, a vacuum port opening into the vacuum chamber and connectable with means for inducing pressures below ambient pressure, and a vent port in the body for venting that portion of the cavity located between the first and third seals.

11. An adapter according to claim 10 and further characterized by a spacer interposed between the first and third seals within the cavity.

References Cited

UNITED STATES PATENTS

| | | | |
|---|---|---|---|
| 2,371,243 | 3/1945 | Jordan | 73—3 |
| 2,478,938 | 8/1949 | Osterhus | 73—4 |
| 3,120,123 | 2/1964 | Werner et al. | 73—182 |
| 3,263,482 | 8/1966 | Shank | 73—4 |

S. CLEMENT SWISHER, Primary Examiner

H. C. POST III, Assistant Examiner

U.S. Cl. X.R.

73—4